(12) United States Patent
Kim (10) Patent No.: US 8,457,242 B2
(45) Date of Patent: Jun. 4, 2013

(54) TRANSMITTER DEVICE AND HDMI SENDER/RECEIVER DEVICE INCLUDING THE SAME

(75) Inventor: Chiwon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 667 days.

(21) Appl. No.: 12/657,940

(22) Filed: Jan. 29, 2010

(65) Prior Publication Data

US 2010/0208778 A1  Aug. 19, 2010

(30) Foreign Application Priority Data

Feb. 19, 2009  (KR) ..................... 10-2009-0014042

(51) Int. Cl.
*H04L 27/00*  (2006.01)

(52) U.S. Cl.
USPC ........... 375/295; 375/148; 375/219; 375/254; 375/257; 375/375; 375/376

(58) Field of Classification Search
USPC ................. 375/219, 295, 257, 148, 255, 375, 375/376; 710/105, 100, 14
See application file for complete search history.

(56) References Cited

U.S. PATENT DOCUMENTS

| | | | |
|---|---|---|---|
| 7,342,419 B2* | 3/2008 | Huang et al. | 326/83 |
| 2006/0284649 A1* | 12/2006 | Cho et al. | 326/83 |
| 2008/0152023 A1 | 6/2008 | Yoshida et al. | |
| 2010/0194994 A1* | 8/2010 | Lee et al. | 348/723 |

FOREIGN PATENT DOCUMENTS

| | | |
|---|---|---|
| JP | 2007274065 | 10/2007 |
| JP | 2007288247 | 11/2007 |
| JP | 2008158595 | 7/2008 |
| KR | 1020070019107 A | 2/2007 |

* cited by examiner

*Primary Examiner* — Dhaval Patel
(74) *Attorney, Agent, or Firm* — Onello & Mello, LLP.

(57) ABSTRACT

A transmitter includes a resistor, a protection unit, and a transmission unit. The resistor control unit controls a connection of a termination resistor between first and second transmission lines. The protection unit reduces first and second voltages, respectively, from the first and second transmission lines during a power-down mode. The transmission unit receives the dropped first and second voltages during the power-down mode and transmits first and second signals through the protection unit during a power-on mode. The resistor control unit connects the termination resistor to the first and second transmission lines when a transmission rate of the first and second signals is equal to or greater than a predetermined value. The resistor control unit is disconnected from at least one of the first and second transmission lines when the transmission rate is less than the predetermined value.

8 Claims, 7 Drawing Sheets

TRANSMITTER DEVICE AND HDMI SENDER/RECEIVER DEVICE INCLUDING THE SAME

CROSS-REFERENCE TO RELATED APPLICATIONS

This U.S. non-provisional patent application claims priority under 35 U.S.C. §119 to Korean Patent Application No. 10-2009-0014042, filed on Feb. 19, 2009, the entire contents of which are incorporated herein by reference.

BACKGROUND

1. Field

The present disclosure herein relates to a transmitter, and more particularly, to a High Definition Multimedia Interface (HDMI) transmitter device.

2. Description of Related Art

Generally, multimedia systems include multimedia sources such as DVD players and set-top boxes that provide multimedia signals to multimedia output devices such as TVs or computers that output the multimedia signals provided from the multimedia sources.

Well-known interfaces are generally used to send/receive data between the multimedia sources and the multimedia output devices. Examples of such interfaces include High Definition Multimedia Interface (HDMI) and Digital Video Interface (DVI) for sending/receiving digital data. Here, DVI and HDMI are mutually compatible when conversion cables are provided. Accordingly, a DVI-compatable multimedia source may be connected to an HDMI-compatable multimedia output device.

SUMMARY

The present disclosure provides a HDMI transmitter operating at about 3.3V or less.

Embodiments of the inventive concept provide transmitters including: a resistor control unit that controls a connection of a termination resistor between first and second transmission lines; a protection unit that reduces first and second voltages, respectively, from the first and second transmission lines during a power-down mode; and a transmission unit to which the reduced first and second voltages are applied by the protection unit during the power-down mode, the transmission unit transmitting first and second signals through the protection unit during a power-on mode, wherein the resistor control unit connects the termination resistor between the first and second transmission lines when a transmission rate of the first and second signals is equal to or greater than a predetermined value, and wherein: the resistor control unit is disconnected from at least one of the first and second transmission lines when the transmission rate is less than the predetermined value.

In some embodiments, the transmitter may further include a bias power source unit that provides a bias voltage to the protection unit, wherein the bias power source unit applies the bias voltage to gate terminals of transistors of the protection unit to allow the transistors of the protection unit to be in a weak turn-on state.

In other embodiments, the transmitter may further include a resistor control unit that connects a termination resistor between the first and second transmission lines, wherein the resistor control unit changes or converts a resistance value of the termination resistor.

In still other embodiments, the transmitter may further include a level shifter that sets a resistance value of the termination resistor of the resistor control unit, wherein the level shifter drops or reduces levels of the first and second voltages transmitted from the first and second transmission lines during the power-on mode.

In even other embodiments, the protection unit may include a high-voltage transistor having a thick gate.

In yet other embodiments, the transmission unit may include a low-voltage transistor having a thin gate for a high-speed transmission.

In further embodiments, the first and second signals may have opposite phases to each other.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings, the thickness of layers and regions are exaggerated for clarity. In the drawings.

DETAILED DESCRIPTION OF THE EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout the accompanying figures.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Although the terms first, second, and the like may be used in this specification to describe respective components or sections, these terms are used for clear description and these components or sections are not limited by these terms.

Figure 1:
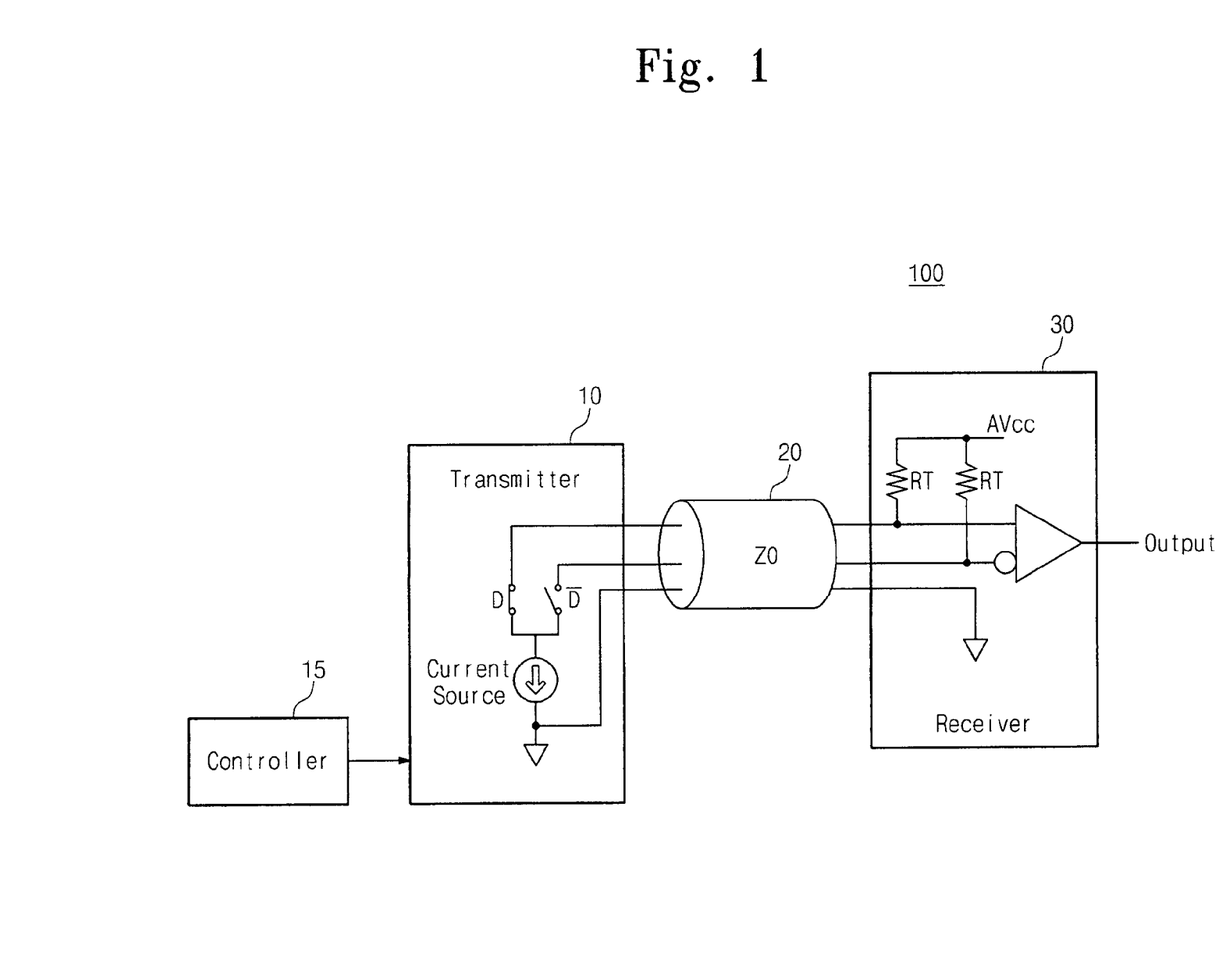
FIG. 1 is a block diagram illustrating a transmitter/receiver device according to an embodiment.

FIG. 1 is a block diagram illustrating a transmitter/receiver device 100 according to an embodiment.

Referring to FIG. 1, the transmitter/receiver device 100, also referred to as a sender/receiver device, according to an embodiment includes a transmitter 10, controller 15, a transmission line 20, and a receiver 30.

In an embodiment, the transmitter/receiver device 100 complies with High Definition Multimedia Interface (HDMI), which is well-known to those of ordinary skill in the art. According to HDMI specifications, the transmitter 10 operates according to an about 3.3V signal received from the receiver 30. Accordingly, the transmitter 10 may include a transistor that operates at a voltage of about 3.3V. However, as advanced development of processes approaches a deep sub-micron process, a transistor that operates at a voltage of about 3.3V may not be generated due to reliability issues. Therefore, a HDMI transmitter including a transistor can operate at a lower voltage than 3.3V. In an embodiment, a transmission unit according to an embodiment may include a Field Effect Transistor (FET) that operates at a voltage of about 2.5V.

The transmitter 10 transmits data D and /D to the receiver 30 through the transmission line 20; the data D and /D are inputted in response to a control signal provided by the controller 15. The transmission line 20 includes a cable having an impedance Z0. In an embodiment, the receiver 30 applies a voltage of about 3.3V to the transmitter 10 through the transmission line 20. Accordingly, the transmitter 10 operates according to the voltage of about 3.3V applied from the receiver 30.

For example, if the impedance Z0 of the transmission line 20 is about 50 ohms, a resistor RT connected between the transmission line 20 and a power source is configured to be about 50 ohms. That is, impedances between the receiver 30 and the transmission line 20 are matched to minimize signal reflection.

A typical HDMI carries signals on four channels: three data channels and one clock channel. In an embodiment illustrated in FIG. 1, one data channel is shown. However, FIG. 1 can also refer to HDMI including one ore more data channels, for example, three data channels, and one clock channel having the same configuration as the at least one data channel. Hereinafter, the data channel will be described in detail with reference to FIGS. 1 through 6, and the clock channel will be described in detail with reference to FIG. 7.

Figure 2:
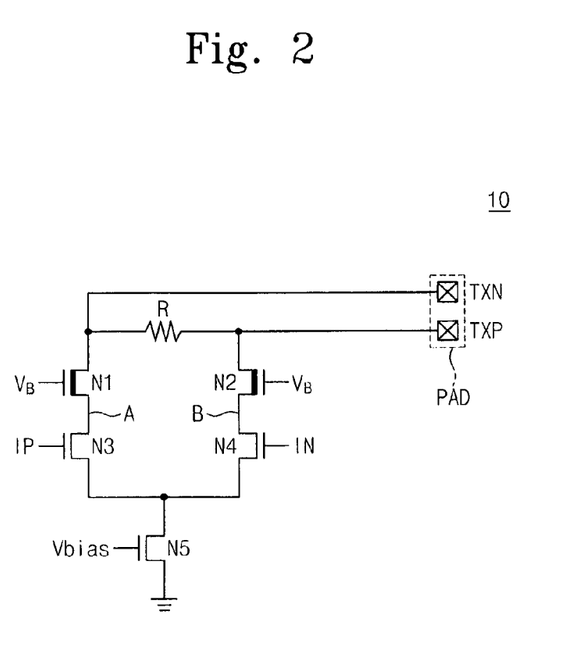
FIG. 2 is a circuit diagram illustrating a transmitter according to an embodiment.

FIG. 2 is a circuit diagram illustrating a transmitter according to an embodiment.

Referring to FIGS. 1 and 2, a transmitter 10 according to an embodiment includes first to fifth NMOS transistors N1 to N5, and a termination resistor R.

The first and second NMOS transistors N1 and N2 are used as a resistor, and can therefore protect outputs of the third and fourth NMOS transistors N3 and N4, respectively. The third and fourth NMOS transistors N3 and N4 are low-voltage transistors having thin gates. The first NMOS transistor N1 is connected to the third NMOS transistor N3 in a stacked structure to prevent a voltage applied to a node A from increasing to a degree that the third NMOS transistor N3 can not endure or properly function. The first and second NMOS transistors N1 and N2 are high-voltage transistors having thick gates. The gates of the first and second NMOS transistors N1 and N2 are shown by thick lines in FIG. 2. The first and second NMOS transistors N1 and N2 are controlled by a voltage signal $V_B$.

The third NMOS transistor N3 is connected between the first NMOS transistor N1 and the fifth NMOS transistor N5, and is controlled by positive data IP. The fourth NMOS transistor N4 is connected between the second NMOS transistor N2 and the fifth NMOS transistor N5, and is controlled by negative data IN. The fifth NMOS transistor N5 is connected between the third NMOS transistor N3 and the ground voltage, and is controlled by a bias voltage Vbias. The termination resistor R is connected between a positive data cable TXP and a negative data cable TXN. A resistance value of the termination resistor R according to an embodiment may range from about 300 ohms to about 400 ohms.

According to specifications of the HDMI, if the transmission rate of the HDMI transmitter is greater than about 1.65 Gbps (Gigabits per second), the transmitter 10 is constructed and arranged to include the termination resistor R between the positive data cable TXP and the negative data cable TXN. However, a clock cable does not generally require a resistor due to the transmission rate. Detailed description of a clock transmission unit will be made with reference to FIG. 7.

Figure 3:
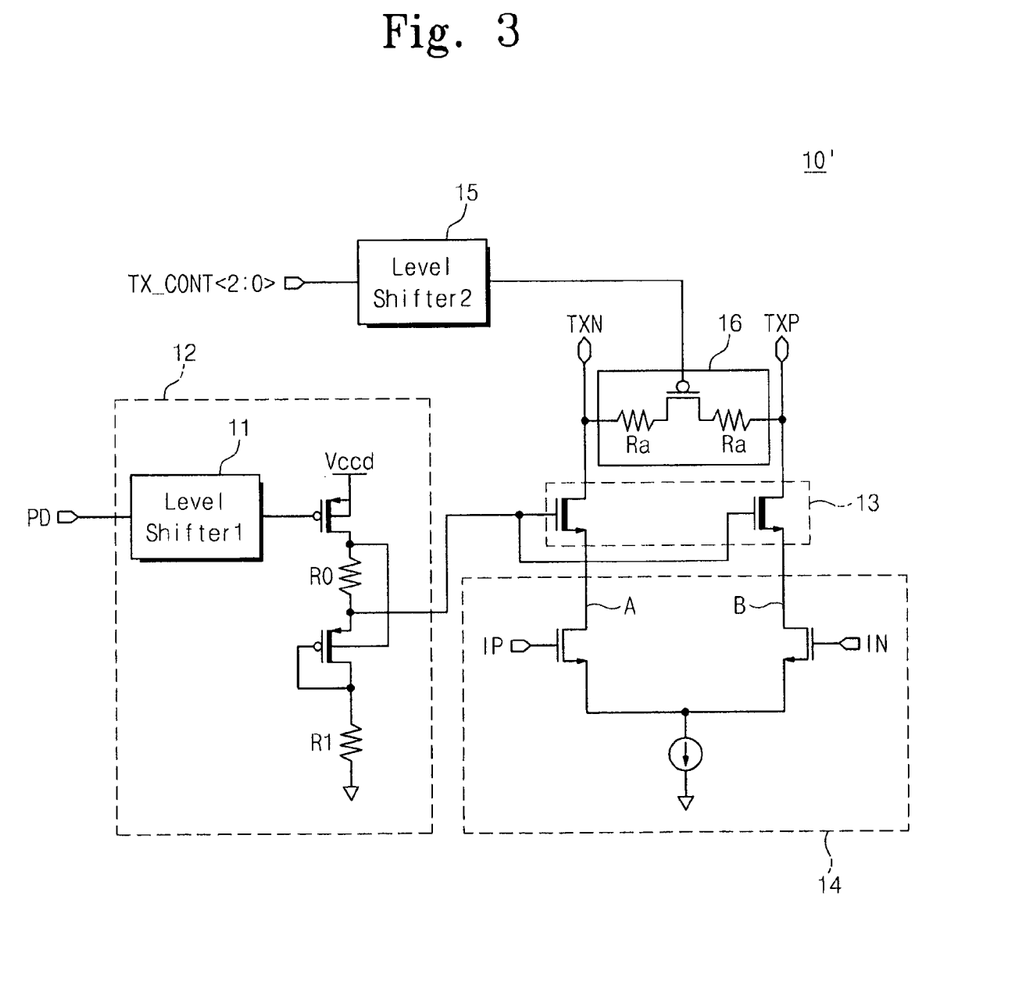
FIG. 3 is a circuit diagram illustrating a transmitter according to another embodiment.

FIG. 3 is a circuit diagram illustrating a transmitter 10' according to another embodiment.

Referring to FIG. 3, the transmitter 10' includes a first level shifter 11, a bias power source unit 12, a protection unit 13, a data transmission unit 14, a second level shifter 15, and a resistor control unit 16.

In an embodiment, the first and second level shifters 11 and 15 can have similar configurations. The first and second level shifters 11 and 15 shift a voltage level of an input signal. For example, the first and second level shifters 11 and 15 shift an input voltage level of about 1.2V to an input voltage level of about 2.5V.

In an embodiment, the first level shifter 11 shifts a voltage level of an input signal PD, and the second level shifter 15 shifts a voltage level of an input signal TX_CONT<2:0>. The first level shifter 11 will be described in detail with reference to FIG. 4, and the second level shifter 15 will be described in detail with reference to FIG. 5.

The bias power source unit 12 provides a bias voltage to the protection unit 13. In an embodiment, as shown in FIG. 3, the bias power source unit 12 includes the first level shifter 11. In another embodiment, the first level shifter 11 is separate from, and coupled to, the bias power source unit 12.

The protection unit 13 protects a transistor of the data transmission unit 14 according to the control of the bias power source unit 12. That is, the protection unit 13 drops or reduces a voltage of about 3.3V applied from data transmission cables TXP and TXN to a voltage level, for example, about 1.2V, that a transistor of the data transmission unit 14 having a thin gate can endure. In an embodiment, the transistor of the data transmission unit 14 having a thin gate operates at a voltage of about 1.2V, and a transistor of the protection unit 13 having a thick gate operates at a voltage of about 2.5V.

The data transmission unit 14 is constructed and arranged similarly to the transmitter shown in FIG. 2, except that the transmitter shown in FIG. 3 includes the resistor control unit 16. The data transmission unit 14 transmits signals responsive to positive data IP and negative data IN signals to the data transmission cables TXN and TXP, respectively. In an embodiment, the data IP, IN signals have opposite phases to each other.

The resistor control unit 16 comprises a plurality of resistors Ra, also referred to as termination resistors, that are coupled between the positive data cable TXP and the negative data cable TXN. The resistor control unit 16 is controlled in response to the second level shifter 15. In an embodiment, the resistors Ra are connected between the data cables TXP, TXN in response to the resistor control unit 16 when a transmission rate is equal to or greater than a predetermined value. In an embodiment, the resistors Ra are disconnected from each other, and disconnected from at least one of the data cables TXP, TXN when the transmission rate is less than the predetermined value. In an embodiment, the resistor control unit 16 electrically separates the data cables TXP, TXN from each other. In an embodiment, the resistor control unit 16 changes or converts a resistance value of the resistors Ra.

The resistor control unit 16 will be described in detail with reference to FIG. 7.

Figure 4:
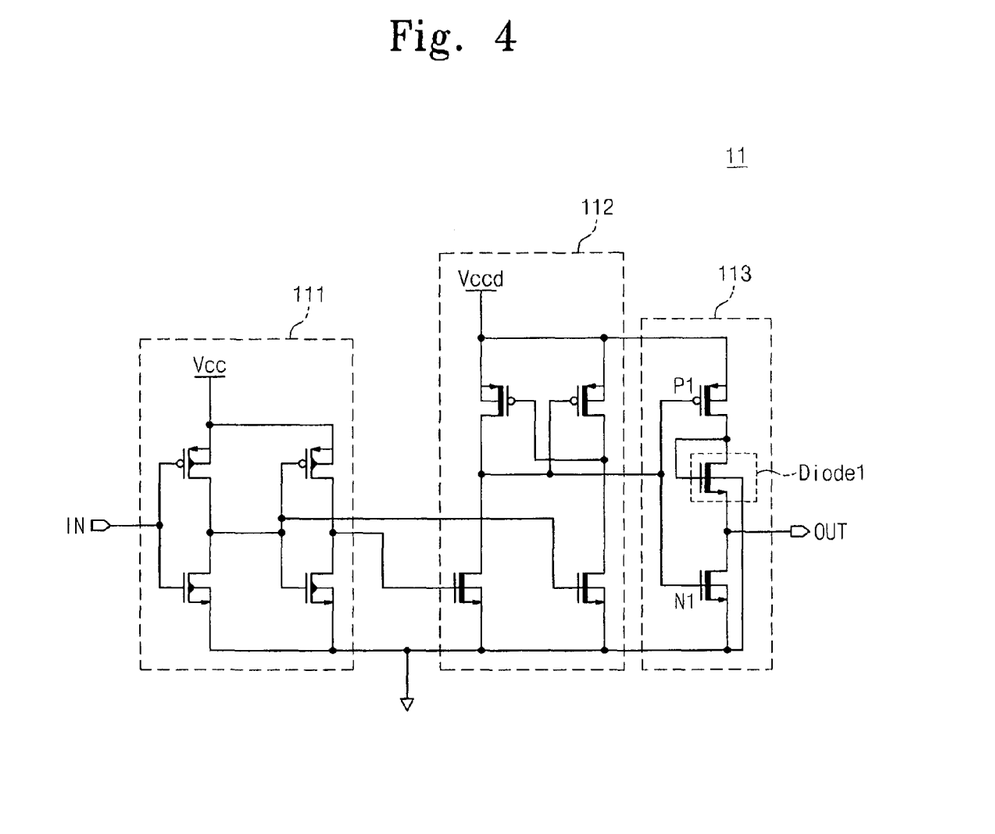
FIG. 4 is a circuit diagram illustrating a first level shifter shown in FIG. 3.

FIG. 4 is a circuit diagram illustrating a first level shifter shown in FIG. 3.

Referring to FIG. 4, a first level shifter 11 includes an input unit 111, an amplifying unit 112, and an output unit 113. The input unit 111 transmits an input signal IN having a voltage level Vcc to the amplifying unit 112. The amplifying unit 112 amplifies the input signal IN to a voltage level Vccd. The output unit 113 inverts the amplified input signal to output an output signal. In this embodiment, the voltage level Vcc and the voltage level Vccd are about 1.2V and about 2.5V, respectively.

The output unit 113 further includes a first diode Diode1. The first diode Diode1 is connected between an output terminal OUT and a first NMOS transistor N1. In an embodiment, the first diode Diode1 is implemented in an NMOS FET.

Referring to FIGS. 3 and 4, for example, if the voltage level Vccd is about 2.5V, a voltage of the first level shifter 11 provides about 0V or about 1.8V due to a voltage drop of the first diode Diode1. The bias power source unit 12 is constructed and arranged to allow transistors of the protection unit 13 to be in a weak turn-on state during a power-down mode. That is, the transistors of the protection unit 13 in a weak turn-on state operate as a resistor having a high resistance. Also, the bias power source unit 12 is constructed and arranged to allow the transistors of the protection unit 13 to be in a turn-on state during a power-on mode.

Accordingly, the protection unit 13 drops or reduces a voltage of about 3.3V or more applied from the data transmission cables TXP and TXN to a voltage of about 1.2V or less that the data power source unit 12 can endure.

Figure 5:
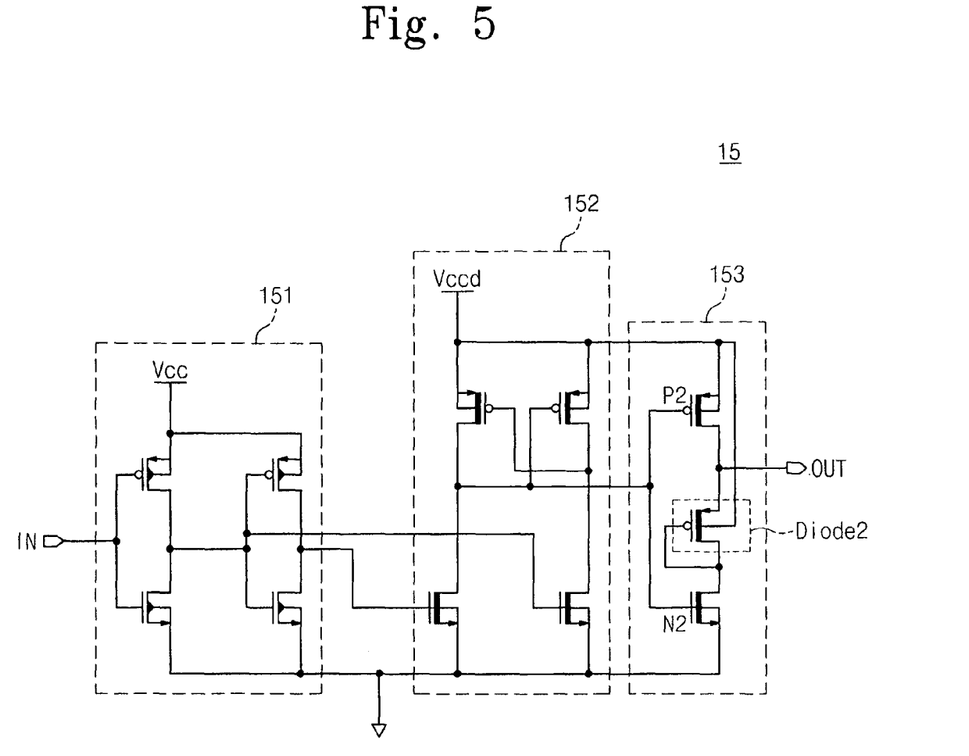
FIG. 5 is a circuit diagram illustrating a second level shifter shown in FIG. 3.

FIG. 5 is a circuit diagram illustrating a second level shifter shown in FIG. 3.

The second level shifter 15 is identical to the level shifter shown in FIG. 4, except for differences in configuration of an output unit. Accordingly, detailed descriptions of the same elements will be omitted below.

Referring to FIG. 5, a second level shifter 15 includes an input unit 151, an amplifying unit 152, and an output unit 153. The output unit 153 further includes a second diode Diode2.

The second diode Diode2 is connected between an output terminal OUT and a second PMOS transistor P2. The second diode Diode2 is implemented in a PMOS FET transistor. The second level shifter 15 adds the second diode Diode2 to the output unit 153 to prevent a ground voltage VSS from being applied to a resistor control unit, for example, resistor control unit 16 shown in FIG. 3.

Referring to FIGS. 3 and 5, for example, if the voltage level Vccd is about 2.5V, a voltage of the second level shifter 15 provides about 0.7V or about 2.5V due to a voltage drop of the second diode Diode2.

The second level shifter 15 controls not to apply a voltage level of about 3.3V or more to the transistors (MP1 to MP3 of FIG. 6) of the resistor control unit 16 during power-on mode. Detailed description of an operation of the resistor control unit 16 will be made with reference to FIG. 6.

Figure 6:
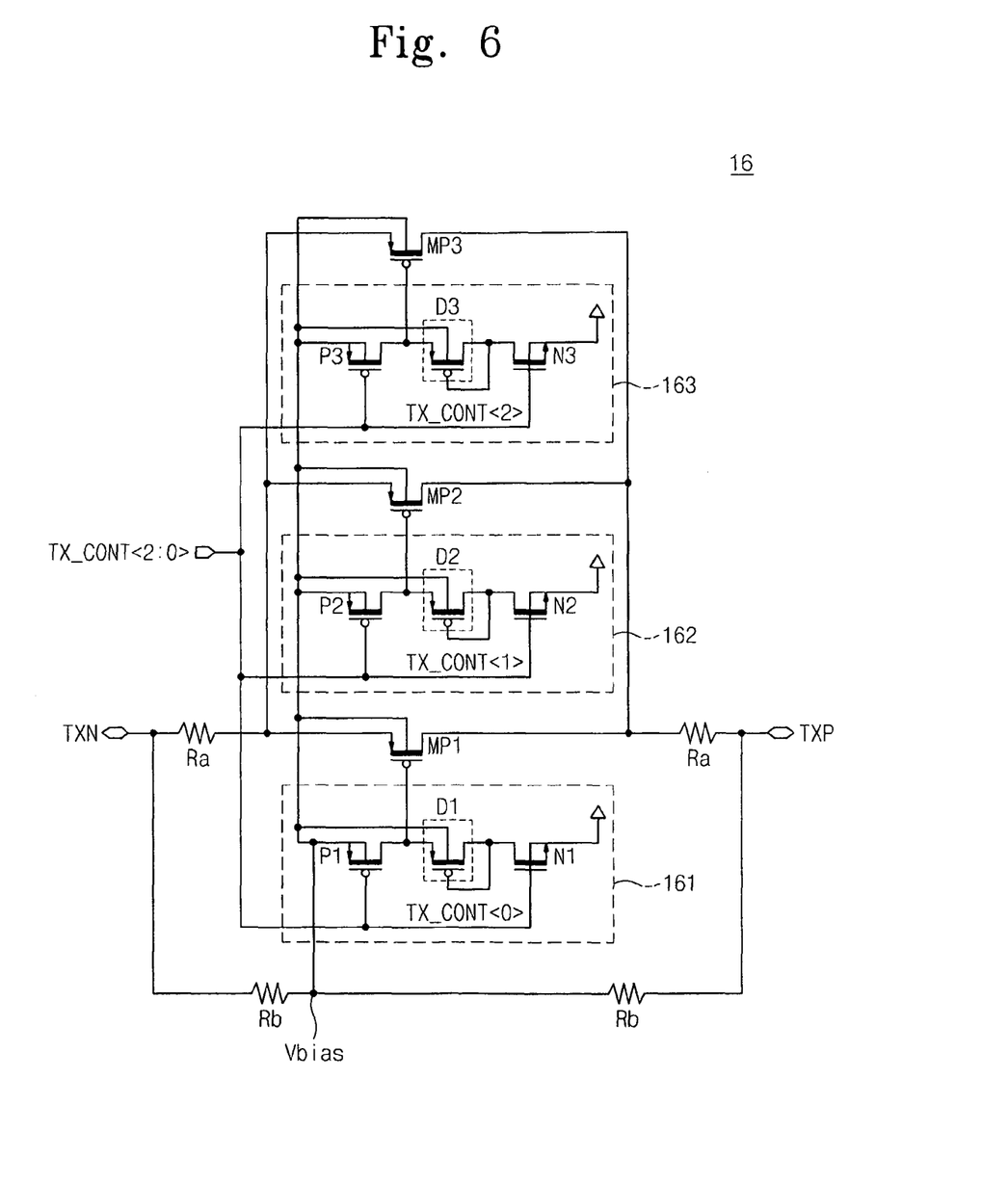
FIG. 6 is a circuit diagram illustrating a resistor control unit shown in FIG. 3.

FIG. 6 is a circuit diagram illustrating a resistor control unit 16 shown in FIG. 3.

Figure 7:
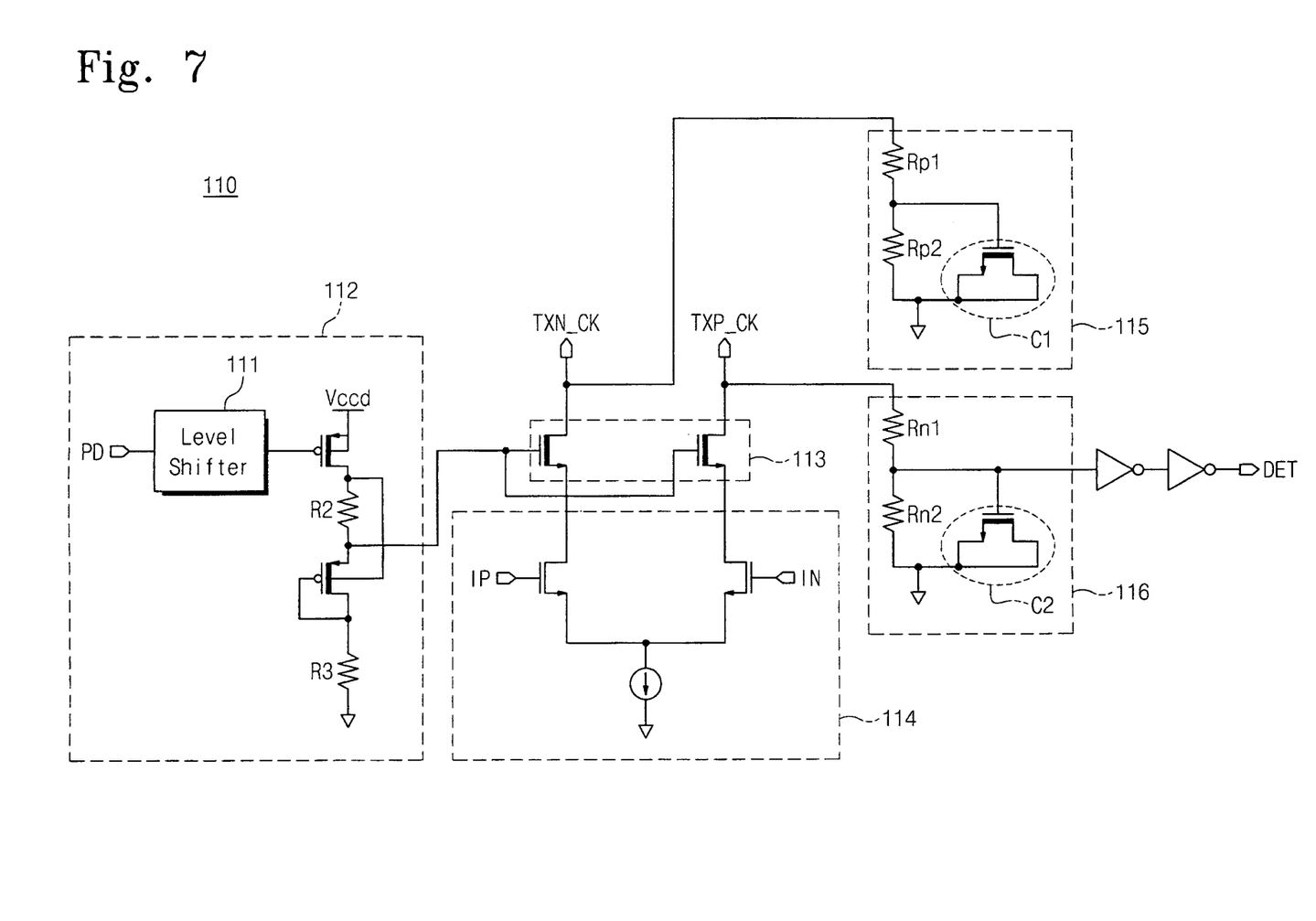
FIG. 7 is a circuit diagram illustrating a clock signal transmitter according to an embodiment.

Referring to FIGS. 3, 5, and 7, a resistor control unit 16 includes first to third termination transistors MP1 to MP3, first to third termination transistor control units 161 to 163, and resistors Ra and Rb.

The first termination transistor control unit 161 includes a first PMOS transistor P1, a diode D1, and a first NMOS transistor N1. The first PMOS transistor P1, the diode D1, and the first NMOS transistor N1 are connected in series. A signal TX_CONT<0> is connected gates of the first PMOS transistor P1 and the first NMOS transistor N1.

The second termination transistor control unit 162 includes a second PMOS transistor P2, a diode D2, and a second NMOS transistor N2. The second PMOS transistor P2, the diode D2, and the second NMOS transistor N2 are connected in series. A signal TX_CONT<1> is connected to the second PMOS transistor P2 and the second NMOS transistor N2.

The third termination transistor control unit 163 includes a third PMOS transistor P3, a diode D3, and a third NMOS transistor N3. The third PMOS transistor P3, the diode D3, and the third NMOS transistor N3 are connected in series. A signal TX_CONT<2> is connected to the third PMOS transistor P3 and the third NMOS transistor N3.

The first termination transistor control unit 161 receives a signal TX_CONT<0> transmitted from a controller to control the first termination transistor MP1. The second termination transistor control unit 162 receives a signal TX_CONT<1> transmitted from a controller to control the second termination transistor MP2. The third termination transistor control unit 163 receives a signal TX_CONT<2> transmitted from a controller to control the third termination transistor MP3. When TX_CONT<2:0> is in a low state, the second level shifter 15 provides a voltage of about 0.5V to about 0.6V. When TX_CONT<2:0> is in a high state, the second level shifter 15 provides a voltage of about 2.5V.

When TX_CONT<2:0> is in a low state, that is, the first to third termination transistor control units 161 to 163 are in an activated state, the second level shifter 15 protects the first to third NMOS transistors N1 to N3.

When TX_CONT<2:0> is in a high state, that is, the first to third termination transistor control units 161 to 163 are in an inactivated state, the second level shifter 15 protects the first to third diodes D1 to D3.

A voltage of about 3.3V is applied to the positive data cable TXP, and a voltage of about 2.8V is applied to the negative data cable TXN. Thus, a bias voltage of about 3.0V is provided. The bias voltage is provided to bodies of all PMOS transistors of the resistor control unit 16.

In an embodiment, a capacity value of the resistance value of resistor Rb, for example, power capacity, is sufficiently great to implement high-speed data communication in the positive data cable TXP and the negative data cable TXN.

FIG. 7 is a circuit diagram illustrating a clock signal transmitter according to an embodiment.

Referring to FIG. 7, a clock signal transmitter 110 includes a level shifter 111, a bias power source unit 112, a protection unit 113, a clock transmission unit 114, and first and second resistor circuit units 115 and 116.

The level shifter 111 shifts a voltage level of an input signal PD. The operation of the level shifter 111 is identical to that of the level shifter 11 shown in FIG. 4.

The bias power source unit 112 provides a bias voltage to the protection unit 113. The operation of the bias power source unit 112 is identical to that of the bias power source unit 12 shown in FIG. 3. In an embodiment, as shown in FIG. 7, the bias power source unit 112 includes the first level shifter 111. In another embodiment, the first level shifter 111 is separate from, and coupled to, the bias power source unit 112.

The protection unit 113 protects one or more transistors of the clock transmission unit 114 according to the control of the bias power source unit 112. That is, the protection unit 113 drops or reduces a voltage of about 3.3V applied from clock transmission cables TXP_CK and TXN_CK to a voltage level, for example, about 1.2V, that a transistor of the data transmission unit 114 having a thin gate can endure. The transistor of the data transmission unit 114 having a thin gate is operated at a voltage of about 1.2V, and a transistor of the protection unit 113 having a thick gate is operated at a voltage of about 2.5V.

The first and second resistor circuit units 115 and 116 match loading conditions of clock signals of the clock transmission cables TXN_CK and TXP_CK. That is, the first resistor circuit unit 115 matches the loading condition of the negative clock transmission cable TXN_CN using resistors Rp1 and Rp2 and a capacitor C1. The second resistor circuit unit 116 matches the loading condition of the positive clock transmission cable TXP_CK. The second resistor circuit unit 116 outputs a detection signal DET from the positive clock transmission cable TXP_CK. Due to low transmission rate, the clock signal transmitter 110 does not require a resistor connected between the clock transmission cables TXP and TXN.

According to embodiments, HDMI transmitter devices can be operated at a low voltage.

The above-disclosed subject matter is to be considered illustrative and not restrictive, and the appended claims are intended to cover all such substitutions, modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claims is:

1. A transmitter comprising:
    a resistor control unit that controls a connection of a termination resistor between first and second transmission lines;
    a protection unit that reduces first and second voltages, respectively, from the first and second transmission lines during a power-down mode; and
    a transmission unit to which the reduced first and second voltages are applied by the protection unit during the power-down mode, the transmission unit transmitting first and second signals through the protection unit during a power-on mode, wherein:
    the resistor control unit controls the connection of the termination resistor between first and second transmission lines by connecting the termination resistor between the first and second transmission lines when a transmission rate of the first and second signals is equal to or greater than a predetermined value, and wherein:
    the resistor control unit controls the connection of the termination resistor between first and second transmission lines by disconnecting the termination resistor from at least one of the first and second transmission lines when the transmission rate is less than the predetermined value.

2. The transmitter of claim 1, further comprising a bias power source unit that provides a bias voltage to the protection unit, wherein the bias power source unit applies the bias voltage to gate terminals of transistors of the protection unit to allow the transistors of the protection unit to be in a weak turn-on state.

3. The transmitter of claim 1, further comprising a level shifter that sets a resistance value of the termination resistor of the resistor control unit, wherein the level shifter reduces levels of the first and second voltages transmitted from the first and second transmission lines during the power-on mode.

4. The transmitter of claim 1, wherein the resistor control unit changes a resistance value of the termination resistor.

5. The transmitter of claim 1, wherein the protection unit comprises a high-voltage transistor having a thick gate.

6. The transmitter of claim 1, wherein the transmission unit comprises a low-voltage transistor having a thin gate for a high-speed transmission.

7. The transmitter of claim 1, wherein the first and second signals have opposite phases to each other.

8. A High Definition Multimedia Interface (HDMI) sender/receiver device comprising the transmitter of claim 1.

* * * * *